(12) United States Patent
Song et al.

(10) Patent No.: US 12,015,848 B2
(45) Date of Patent: Jun. 18, 2024

(54) ELECTRONIC DEVICE PERFORMING IMAGE STABILIZATION AND OPERATING METHOD THEREOF

(71) Applicant: Samsung Electronics Co., Ltd., Suwon-si (KR)

(72) Inventors: Wonseok Song, Suwon-si (KR); Kyungdong Yang, Suwon-si (KR); Jaemu Yun, Suwon-si (KR); Jiyeon Jo, Suwon-si (KR); Songha Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/075,750

(22) Filed: Dec. 6, 2022

(65) Prior Publication Data

US 2023/0101888 A1  Mar. 30, 2023

Related U.S. Application Data

(63) Continuation of application No. PCT/KR2022/011891, filed on Aug. 10, 2022.

(30) Foreign Application Priority Data

Aug. 10, 2021 (KR) .......................... 10-2021-0105683

(51) Int. Cl.
*H04N 23/68* (2023.01)
*H04N 23/71* (2023.01)

(52) U.S. Cl.
CPC ....... *H04N 23/683* (2023.01); *H04N 23/6812* (2023.01); *H04N 23/71* (2023.01)

(58) Field of Classification Search
None
See application file for complete search history.

(56) References Cited

U.S. PATENT DOCUMENTS

| 9,426,370 | B2 | 8/2016 | Li et al. |
| 9,525,824 | B2 | 12/2016 | Moon et al. |
| 10,674,088 | B2 | 6/2020 | Sun |
| 10,708,512 | B2 | 7/2020 | Sun et al. |

(Continued)

FOREIGN PATENT DOCUMENTS

| KR | 10-2017-0131608 A | 11/2017 |
| KR | 10-2020-0048609 A | 5/2020 |

(Continued)

*Primary Examiner* — James M Hannett
(74) *Attorney, Agent, or Firm* — Jefferson IP Law, LLP

(57) ABSTRACT

An electronic device of an embodiment of the present document may include a camera including a lens assembly, at least one sensor configured to detect a movement of the camera or the lens assembly, and a processor electrically connected to the camera and the at least one sensor. The processor may determine an exposure value that will be applied when photographing using the camera, obtain image frames, based on the exposure value, obtain movement information on the camera or the lens assembly by using the at least one sensor while the image frames are being obtained, determine an image stabilization strength, based on the exposure value and the movement information, and perform video digital image stabilization (VDIS) for the image frames, based on the image stabilization strength.

19 Claims, 8 Drawing Sheets

(56) References Cited

U.S. PATENT DOCUMENTS

| | | |
|---|---|---|
| 11,032,476 B2 | 6/2021 | Kim et al. |
| 11,190,689 B1 * | 11/2021 | Wang .................... H04N 23/90 |
| 2012/0307086 A1 * | 12/2012 | Jefremov ........... H04N 23/6812 |
| | | 348/208.4 |
| 2015/0103189 A1 * | 4/2015 | Karpenko ............ H04N 23/683 |
| | | 348/208.4 |
| 2015/0281580 A1 * | 10/2015 | Karpenko .............. H04N 23/73 |
| | | 348/208.99 |
| 2016/0006935 A1 * | 1/2016 | Zhou ................... H04N 23/683 |
| | | 348/208.1 |
| 2016/0173749 A1 | 6/2016 | Dallas et al. |
| 2017/0054927 A1 | 2/2017 | Lyon |
| 2017/0310901 A1 * | 10/2017 | Sheikh ................... H04N 23/68 |
| 2020/0051265 A1 * | 2/2020 | Kim ........................ G06T 5/003 |
| 2020/0137308 A1 | 4/2020 | Kulik et al. |
| 2020/0267320 A1 | 8/2020 | Song et al. |
| 2021/0385383 A1 | 12/2021 | Kim et al. |

FOREIGN PATENT DOCUMENTS

| | | | |
|---|---|---|---|
| KR | 10-2020-0098790 A | 8/2020 | |
| KR | 10-2020-0101180 A | 8/2020 | |
| WO | 2014/169162 A1 | 10/2014 | |
| WO | WO-2022026126 A1 * | 2/2022 | ......... H04N 5/23254 |

* cited by examiner

ELECTRONIC DEVICE PERFORMING IMAGE STABILIZATION AND OPERATING METHOD THEREOF

CROSS-REFERENCE TO RELATED APPLICATION(S)

This application is a continuation application, claiming priority under § 365(c), of an International application No. PCT/KR2022/011891, filed on Aug. 10, 2022, which is based on and claims the benefit of a Korean patent application number 10-2021-0105683, filed on Aug. 10, 2021, in the Korean Intellectual Property Office, the disclosure of which is incorporated by reference herein in its entirety.

TECHNICAL FIELD

The disclosure relates to an electronic device performing image stabilization or video digital image stabilization (VDIS) and an operating method thereof.

BACKGROUND ART

As electronic devices including cameras become common and users' demands for obtaining high-quality images by using the cameras increase, camera-related technologies are being increasingly advanced.

In the camera-related technology, an image stabilization technology for, when a subject is photographed during movement or when movement/shake occurs during subject photographing, minimizing the effect of movement/shake on an image obtained by a user is also being developed.

In relation to image stabilization, an image stabilization technology considering movement information obtained by an electronic device or considering an illuminance condition (or an exposure value) has been proposed.

The above information is presented as background information only to assist with an understanding of the disclosure. No determination has been made, and no assertion is made, as to whether any of the above might be applicable as prior art with regard to the disclosure.

DISCLOSURE

Technical Problem

According to the related art, when an electronic device obtains an image through a camera, when considering only movement information on the electronic device or considering only an illuminance condition, there can be a limitation in minimizing the effect of movement and shake.

According to the related art, in an electronic device including a plurality of cameras, it can be difficult to adaptively control the effect of movement/shake on an image obtained by a user in a scenario in which switching between the cameras occurs.

Aspects of the disclosure are to address at least the above-mentioned problems and/or disadvantages and to provide at least the advantages described below. Accordingly, an aspect of the disclosure is to provide an electronic device performing image stabilization or video digital image stabilization (VDIS) and an operating method thereof Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a camera including a lens assembly, at least one sensor configured to detect a movement of the camera or the lens assembly, and a processor electrically connected to the camera and the at least one sensor. The processor may determine an exposure value that will be applied when photographing using the camera, obtain image frames, based on the exposure value, obtain movement information on the camera or the lens assembly by using the at least one sensor while the image frames are being obtained, determine an image stabilization strength, based on the exposure value and the movement information, and perform video digital image stabilization (VDIS) for the image frames, based on the image stabilization strength.

In accordance with another aspect of the disclosure, an electronic device is provided. The electronic device includes a first camera including a first lens assembly, a second camera including a second lens assembly, at least one sensor configured to detect a movement of the first camera, the second camera, the first lens assembly, or the second lens assembly, and a processor electrically connected to the first camera, the second camera, and the at least one sensor. The processor may perform a first VDIS, based on the first camera, detect an event of switching a main camera from the first camera to the second camera while performing the first VDIS, identify a parameter difference between the first camera and the second camera, obtain image frames, based on the parameter difference, and obtain movement information on the second camera or the second lens assembly while obtaining the image frames, determine a possible blur degree, based on the parameter difference and the movement information, determine an image stabilization strength, based on the blur degree, and perform a second VDIS for the image frames, based on the image stabilization strength.

Advantageous Effects

According to various embodiments of the disclosure, when an image stabilization technology is applied to an electronic device, all movement information and an illuminance condition (e.g., an exposure value) may be taken into consideration, thereby minimizing the effect of movement/shake.

According to various embodiments of the disclosure, a possible blur degree may be predicted, based on movement information and an illuminance condition (e.g., an exposure value), and an image stabilization strength may be determined to perform image stabilization, based on the predicted blur degree, thereby controlling the effect of movement/shake in a balanced way.

According to various embodiments of the disclosure, even when a camera is switched in an electronic device including a plurality of cameras, an image stabilization technology may be applied in consideration of a parameter between the cameras, thereby adaptively applying the image stabilization technology.

Effects obtainable based on various embodiments are not limited to the effects mentioned above, and other effects not mentioned may be clearly understood by those of ordinary skill in the art to which the present disclosure belongs from a description below.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

Figure 1:
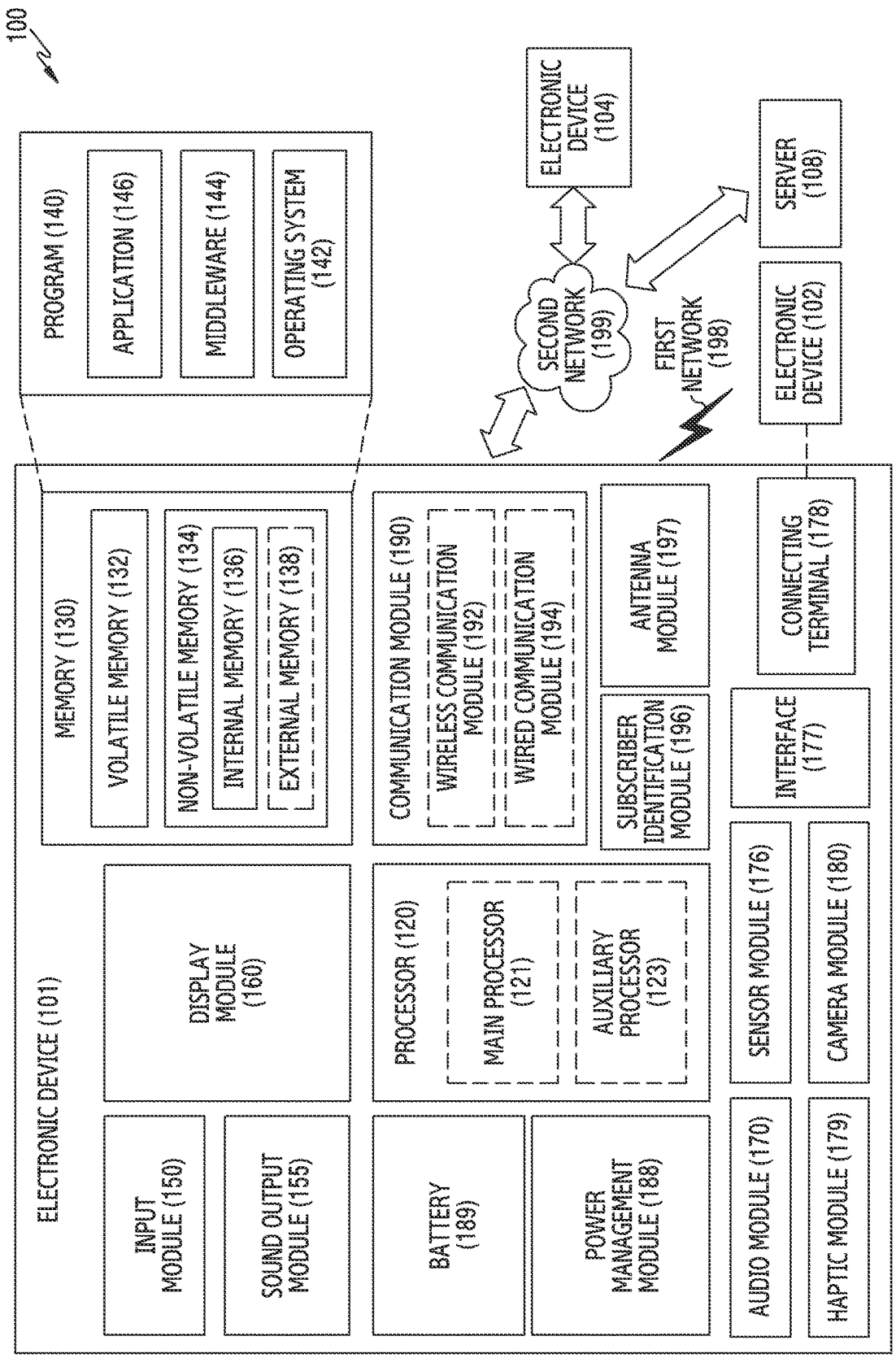
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
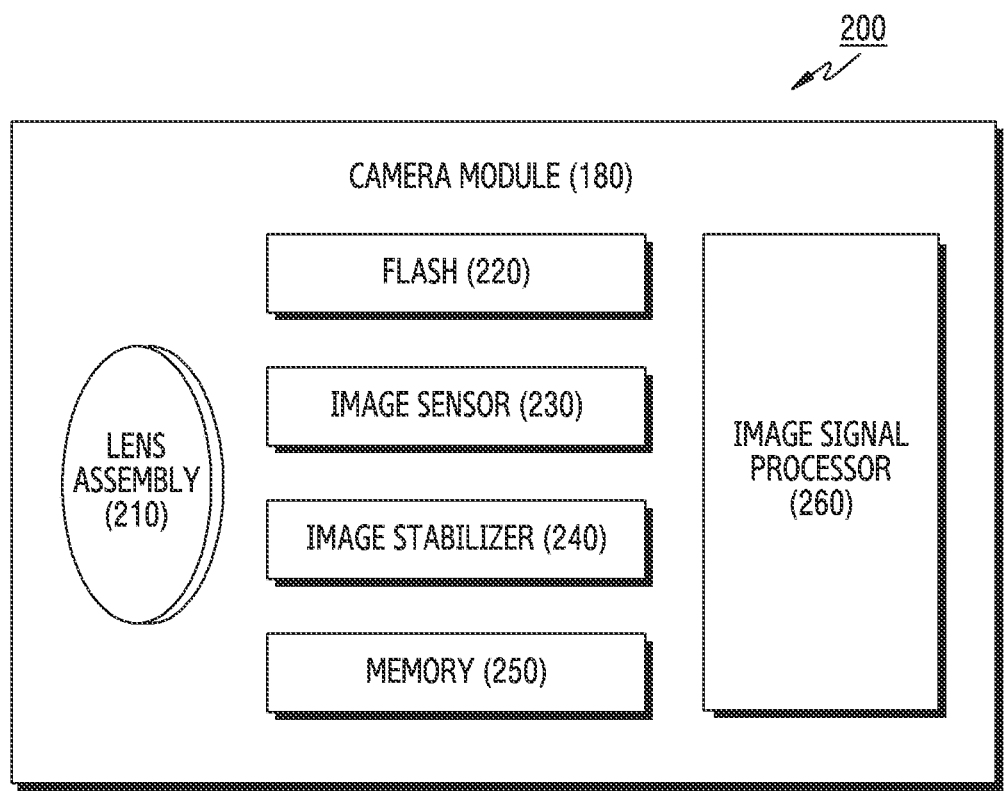
FIG. 2 is a block diagram illustrating a camera module according to an embodiment of the disclosure.

FIG. 2 is a block diagram 200 illustrating the camera module 180 according to an embodiment of the disclosure.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
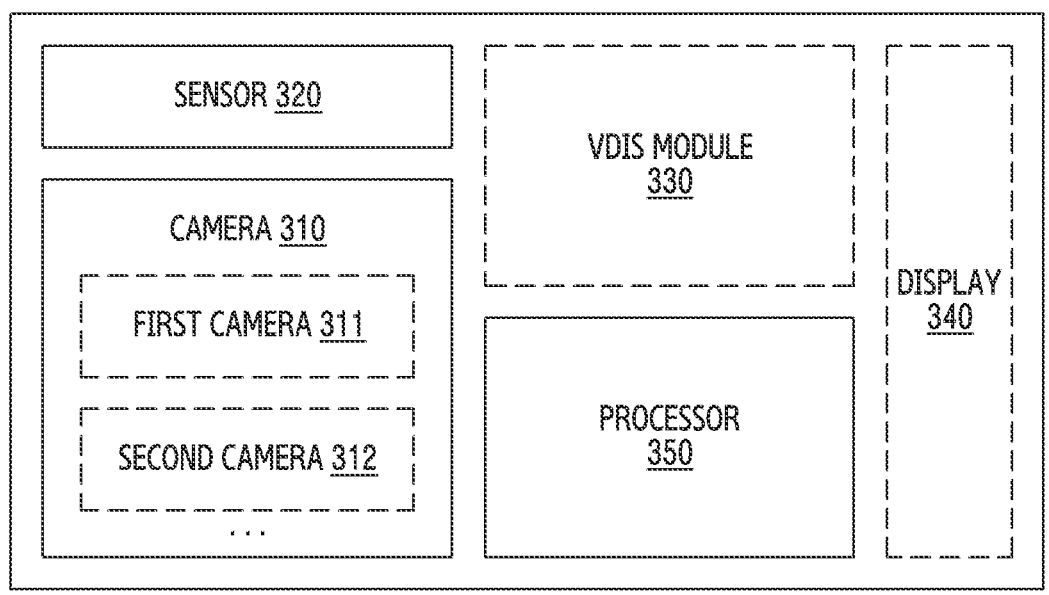
FIG. 3 is a diagram schematically illustrating a construction of an electronic device according to an embodiment of the disclosure.

FIG. 3 schematically illustrates a construction of an electronic device according to an embodiment of the disclosure.

Referring to FIG. 3, the electronic device 101 may include at least a camera 310, a sensor 320, and a processor 350. The electronic device 101 may further include a VDIS module 330 and a display 340 as well.

According to an embodiment, the camera 310, the sensor 320, the display 340, and the processor 350 may correspond to the camera module 180, the sensor module 176, the display module 160, and the processor 120 of FIG. 1, respectively.

In an embodiment, the camera 310 may include a plurality of cameras. For example, the camera 310 may include a first camera 311 and a second camera 312, but is not limited thereto, and may include more cameras as well. For another example, the first camera 311 and the second camera 312 included in the camera 310 may have a different field of view (FOV), and may have a difference in the characteristics of an image sensor, the presence or absence and characteristics of optical image stabilization (OIS), a focal distance, the presence or absence of auto focus (AF), and the characteristics of a zoom operation.

In an embodiment, each of the first camera 311 and the second camera 312 may include components included in the camera module 180 of FIG. 1.

In an embodiment, the camera 310 may obtain image frames for an object, a background, and a light source outside the electronic device 101.

According to an embodiment, the sensor 320 may obtain at least movement information of the electronic device 101, movement information of the camera 310, or movement information of a lens assembly (e.g., the lens assembly 210) dependent on an OIS operation.

According to an embodiment, the sensor 320 may include a gyro sensor.

According to an embodiment, the electronic device 101 may identify a photographing parameter for image frames through the camera 310 and/or the sensor 320. For example, the electronic device 101 may identify an illuminance condition (e.g., an exposure value) by using the camera 310 and/or the sensor 320. However, it may not be limited thereto.

According to an embodiment, the VDIS module 330 may be implemented in hardware as well, but may be implemented in software as well. The VDIS module 330 may perform operations for performing image stabilization or VDIS for image frames obtained by the camera 310. A more detailed description of the VDIS module 330 will be described later with reference to FIG. 4.

According to an embodiment, the display 340 may visually present image frames obtained by the camera 310 to a user. For example, the display 340 may visually present image frames for which image stabilization/VDIS has been performed for the image frames obtained by the camera 310, to the user.

According to an embodiment, the processor 350 may control the components of the electronic device 101 to perform a specified operation. For example, the processor 350 may control the camera 310, the sensor 320, the VDIS module 330, and the display 340, thereby allowing the camera 310, the sensor 320, the VDIS module 330, and the display 340 to perform specified operations, respectively. Also, when the camera 310 includes a plurality of cameras (e.g., the first camera 311 and the second camera 312), the processor 350 may control the first camera 311 and the second camera 312, respectively.

Figure 4:
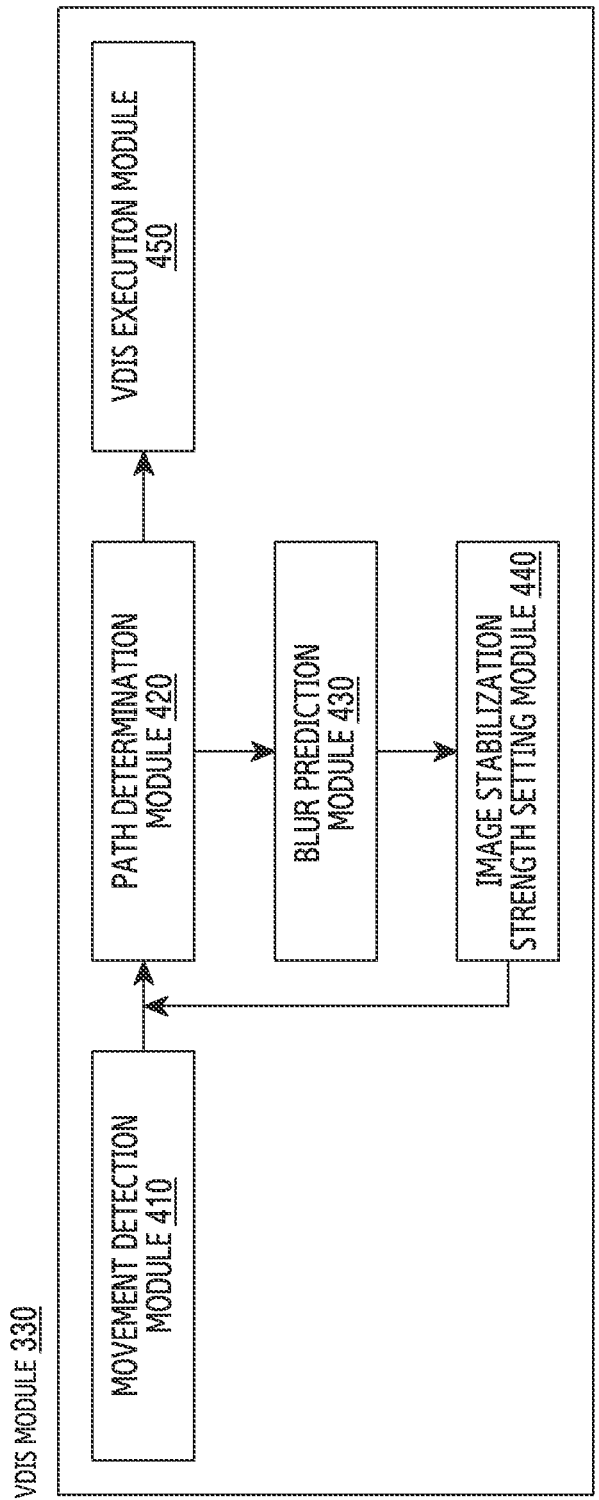
FIG. 4 is a diagram illustrating a construction of a video digital image stabilization (VDIS) module of an electronic device according to an embodiment of the disclosure.

FIG. 4 illustrates a construction of a video digital image stabilization (VDIS) module of an electronic device according to an embodiment of the disclosure.

Referring to FIG. 4, the VDIS module 330 may include a movement detection module 410, a path determination module 420, a blur prediction module 430, an image stabilization strength setting module 440, and a VDIS execution module 450.

In an embodiment, the movement detection module 410 may obtain a movement degree (or a movement amount) of the electronic device 101 or the camera 310. For example, the movement detection module 410 may determine/estimate a movement degree of the electronic device 101 and/or the camera 310, based on image frames obtained by the camera 310 and movement information of the electronic device 101 detected by the sensor 320, movement information of the camera 310, or movement information of a lens assembly (e.g., the lens assembly 210) dependent on an OIS operation.

In an embodiment, the path determination module 420 may perform cumulative determination for the movement information (e.g., the movement degree) of the electronic device 101 and/or the camera 310 obtained by the movement detection module 410.

In an embodiment, the path determination module 420 may determine/estimate a movement path (or a movement trajectory) of the electronic device 101 and/or the camera 310, by using the cumulatively determined movement information (e.g., movement degree) of the electronic device 101 and/or the camera 310.

In an embodiment, the path determination module 420 may provide a stabilization path (or a stabilization trajectory) wherein the movement path (or the movement trajectory) becomes a smooth path (or trajectory), based on the determined/estimated movement path (or movement trajectory). For example, the path determination module 420 may estimate a movement path (or a movement trajectory) corresponding to an average value of the movement degree of the electronic device 101 and/or the camera 310, and may provide, as the stabilization path, the movement path corresponding to the average value of the movement degree. The average value is one example and may not be limited thereto.

In an embodiment, the blur prediction module 430 may predict a blur degree that is possible every image frame, based on information on an image frame capable of being obtained by the electronic device 101 and movement information. For example, the blur prediction module 430 may determine/obtain a blur degree (e.g., an amount of blur, a size of blur, and/or a probability of provision of blur) that is possible every image frame by using an obtained illuminance condition (e.g., exposure value) and/or movement information of the electronic device 101, movement information of the camera 310, or movement information of a lens assembly (e.g., the lens assembly 210) dependent on an OIS operation.

In an embodiment, the blur may be caused by factors such as a shake of the electronic device 101/the camera 310, a focal distance, a shutter speed, AF execution or non-execution, or OIS execution or non-execution.

In an embodiment, the image stabilization strength setting module 440 may set an image stabilization strength, based on a predicted blur degree. For example, the image stabilization strength may mean a strength of, when a movement/shake occurs in image frames according to a movement of the electronic device 101, a movement of the camera 310, or a movement of the lens assembly (e.g., the lens assembly 210) dependent on an OIS operation, performing image stabilization (or shake correction) for the image frames in which the movement/shake occurs. Also, the image stabilization strength setting module 440 may set the image stabilization strength to be lower as the predicted blur degree increases, and may set the image stabilization strength to be higher as the predicted blur degree decreases.

In an embodiment, image frames may be provided for which image stabilization/VDIS are performed based on an image stabilization strength set by the VDIS execution module 450 and the image stabilization strength setting module 440 and a stabilization path (or a stabilization trajectory) determined/provided by the path determination module 420. For example, the VDIS execution module 450 may perform shake correction/image stabilization for an actual movement path according to the image stabilization strength, based on the provided stabilization path.

According to an embodiment, the image stabilization strength setting module 440 may present information on the set image stabilization strength (or shake correction strength) to the path determination module 420. The path determination module 420 may determine/provide a stabilization path (or a stabilization trajectory) in consideration of the received image stabilization strength, and may forward information on the determined/provided stabilization path (or stabilization trajectory) to the blur prediction module 430. The blur prediction module 430 may predict a blur degree that is possible for image frames by using the received stabilization path (or stabilization trajectory) and the illuminance condition (e.g., exposure value), and the blur prediction module 430 may present the predicted blur degree to the image stabilization strength setting module 440.

According to an embodiment, as described above, the operations of the path determination module 420, the blur prediction module 430, and the image stabilization strength setting module 440 may be cyclic.

According to an embodiment, the movement detection module 410, the path determination module 420, the blur prediction module 430, the image stabilization strength setting module 440, and the VDIS execution module 450 included in the VDIS module 330 may be implemented in hardware or may be implemented in software, and may operate under the control of the processor 350.

Figure 5:
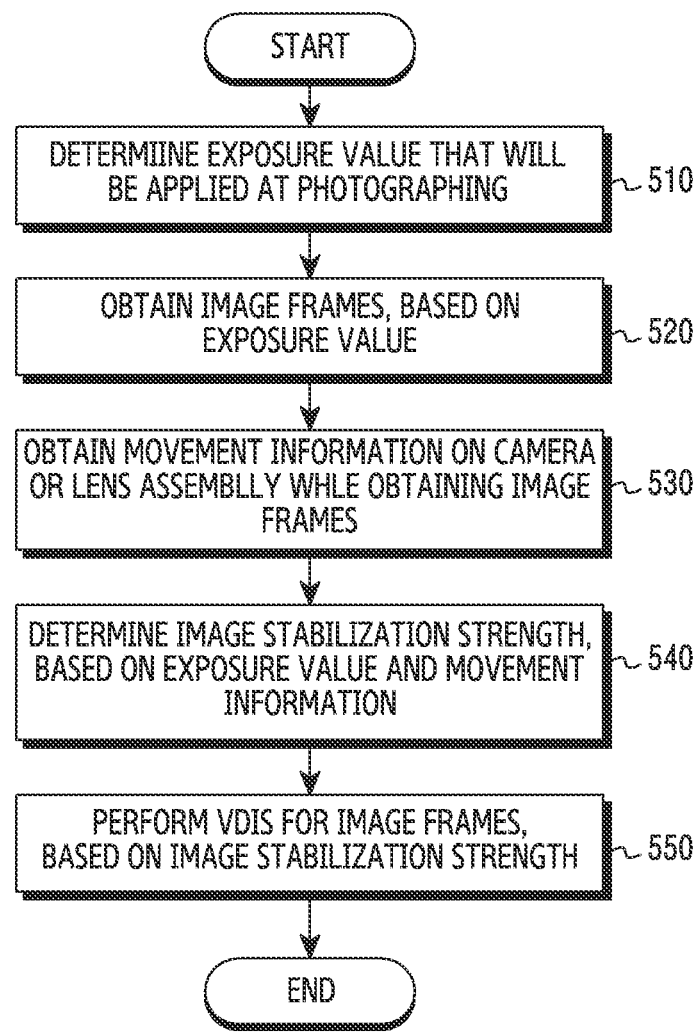
FIG. 5 is a flowchart illustrating a flow in which an electronic device performs VDIS according to an embodiment of the disclosure.

FIG. 5 illustrates a flow in which an electronic device performs VDIS, according to an embodiment of the disclosure.

Referring to FIG. 5, in operation 510, the electronic device may determine an exposure value that will be applied during photographing.

In an embodiment, the electronic device 101 may determine an exposure value that may be applied when photographing (or when obtaining an image frame), under the control of the processor 350.

In an embodiment, the electronic device 101 may determine an exposure value, based on illuminance when photographing (or when obtaining an image frame), under the control of the processor 350.

In an embodiment, the electronic device 101 may maintain or change the determined exposure value according to an event of camera switching, under the control of the processor 350.

In operation 520 of an embodiment, the electronic device may obtain image frames, based on the exposure value.

In an embodiment, the electronic device 101 may perform photographing (or obtain image frames) by using the determined exposure value, under the control of the processor 350.

In operation 530 of an embodiment, the electronic device may obtain movement information on a camera or a lens assembly while obtaining the image frames.

In an embodiment, the electronic device 101 may obtain movement information of the camera 310 under the control of the processor 350. For example, the electronic device 101 may obtain movement information on a movement/shake of the camera 310 under the control of the processor 350. For another example, the electronic device 101 may obtain movement information on a movement/shake of the electronic device 101 that is interlocked with the movement/shake of the camera 310, under the control of the processor 350 as well.

In an embodiment, the electronic device 101 may obtain the movement information on the movement/shake of the electronic device 101 or the camera 310 by using the sensor 320, under the control of the processor 350. For example, the sensor 320 may be a gyro sensor.

In an embodiment, the electronic device 101 may obtain movement information on a lens assembly (e.g., the lens assembly 210) under the control of the processor 350. For example, the electronic device 101 may obtain OIS or not of the camera 310, and the movement information of the lens assembly 210 when OIS is performed, under the control of the processor 350.

In an embodiment, the electronic device 101 may normalize the movement information on the camera 310 (or the electronic device 101) or the lens assembly (e.g., the lens assembly 210) obtained while obtaining the image frames, under the control of the processor 350. For example, the electronic device 101 may classify and normalize the movement information on the camera 310 (or the electronic device 101) or the lens assembly (e.g., the lens assembly 210) according to a movement/shake amount and/or a movement/shake speed, under the control of the processor 350.

In an embodiment, the electronic device 101 may classify and store the normalized movement information in a memory (e.g., the memory 130), under the control of the processor 350 as well.

According to an embodiment, the electronic device may determine a possible blur degree, based on the exposure value and the movement information, between operations 530 and 540 as well.

In an embodiment, the electronic device 101 may set a second weight for the normalized movement information according to a first weight for the exposure value, and the movement/shake amount of the camera 310 (or the electronic device 101), and/or the movement/shake speed, under the control of the processor 350.

In an embodiment, the electronic device 101 may determine a first blur degree that is possible for image frames, based on the first weight for the exposure value and the second weight for the movement information, under the control of the processor 350.

In an embodiment, the electronic device 101 may determine a second blur degree by using OIS movement information of the lens assembly (e.g., the lens assembly 210), under the control of the processor 350. For example, the electronic device 101 may set a third weight by 0 when the lens assembly 210 does not perform OIS, and by 100 when the lens assembly 210 performs 100% OIS, under the control of the processor 350. For another example, the electronic device 101 may set the third weight to a level of 0 to 100 according to a degree of OIS performed by the lens assembly 210, under the control of the processor 350 as well. In a specific example, the electronic device 101 may set the third weight by 50 when a degree of OIS performed by the lens assembly 210 is 50%, under the control of the processor 350. This is one example and an embodiment may not be limited thereto. Also, the electronic device 101 may set the third weight by 0 even when there is not OIS, under the control of the processor 350.

In an embodiment, the electronic device 101 may determine/obtain the second blur degree that is possible for the image frames, by reflecting the third weight related to the OIS execution of the lens assembly 210 on the first blur degree, under the control of the processor 350.

In operation 540 of an embodiment, the electronic device may determine an image stabilization strength, based on the exposure value and the movement information.

In an embodiment, by considering the exposure value and the movement degree together, the electronic device 101 may determine the image stabilization strength corresponding thereto, under the control of the processor 350.

In an embodiment, the electronic device 101 may determine an image stabilization strength for removing the effect of movement/shake on the image frames, by using the determined/obtained blur degree (e.g., second blur degree) that is possible in the image frames, under the control of the processor 350.

In an embodiment, the above-described effect of movement/shake on the image frames may be referred to as an image jitter. There may be effects such as light dragging, light spreading, and blur provision on the image frames due to the movement/shake of the electronic device 101 and/or the camera 310. The above-mentioned content is an example, and an embodiment may not be limited to the above description.

In an embodiment, the electronic device 101 may determine the image stabilization strength to be lower as the predicted blur degree increases, and may determine the image stabilization strength to be higher as the predicted blur degree decreases, under the control of the processor 350.

In operation 550 of an embodiment, the electronic device may perform VDIS for the image frames, based on the image stabilization strength.

In an embodiment, the electronic device 101 may perform image stabilization or VDIS for the obtained image frames, based on the determined image stabilization strength, under the control of the processor 350.

In an embodiment, the execution of the image stabilization or VDIS in operation 550 will be described in more detail with reference to FIG. 6 to FIG. 7.

Figure 6:
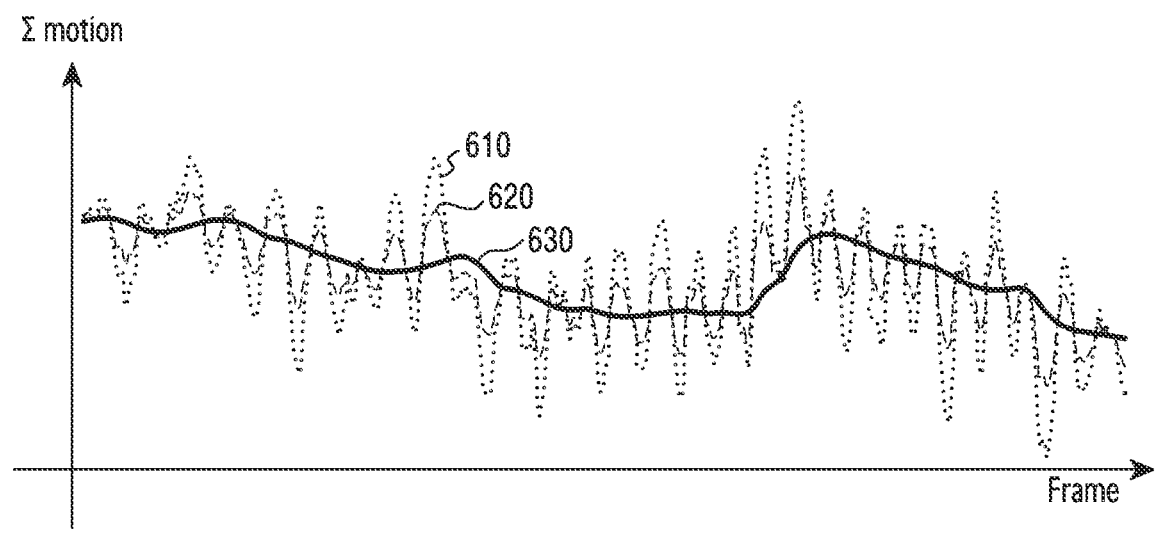
FIG. 6 is a diagram illustrating a state in which VDIS is performed according to an image stabilization strength according to an embodiment of the disclosure.
Figure 7:
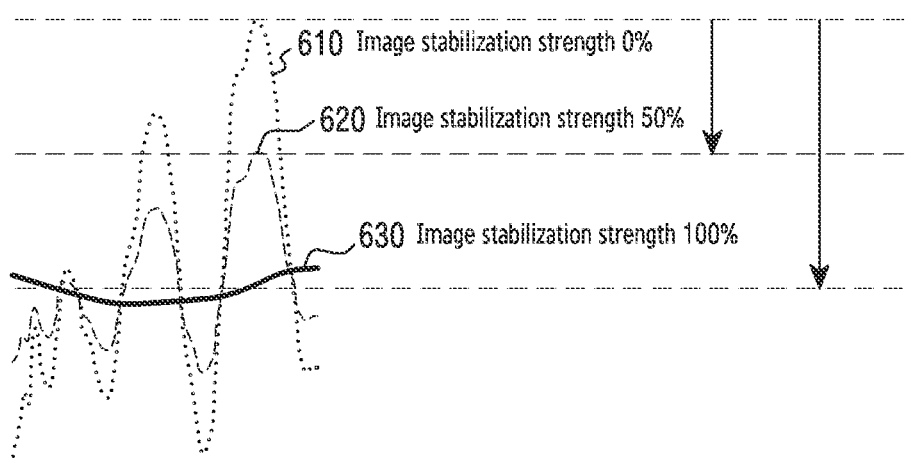
FIG. 7 is a diagram illustrating a detailed state in which VDIS is performed according to image stabilization strength according to an embodiment of the disclosure.

FIG. 6 shows a state in which VDIS is performed according to an image stabilization strength according to an embodiment, and FIG. 7 shows a detailed state in which VDIS is performed according to an image stabilization strength according to an embodiment.

In an embodiment, referring to FIG. 6, different types of graphs may be obtained as VDIS is performed according to an image stabilization strength. The x-axis of FIG. 6 may indicate obtained image frames, and the y-axis may indicate movement information of image frames that are corrected by applying an image stabilization strength and performing image stabilization (or VDIS). For example, the movement information corresponding to the y-axis may be a trajectory/movement of the camera 310, and the unit may be a pixel.

In an embodiment, line 610 may indicate movement information of image frames for which VDIS is not performed, for the sake of comparison with line 620 and line 630.

In an embodiment, the line 620 and the line 630 may indicate movement information of image frames corrected according to an image stabilization strength.

In an embodiment, referring to FIG. 7, the line 610 indicates the movement information of the image frames for which VDIS is not performed, and the line 620 indicates movement information of image frames for which VDIS is performed with an image stabilization strength of 50%, and the line 630 indicates movement information of image frames for which VDIS is performed with an image stabilization strength of 100%.

In an embodiment, the line 630 of FIG. 6 to FIG. 7 may indicate movement information of image frames for which VDIS is performed with an image stabilization strength of 100%, and also the line 630 may correspond to the stabilization path (or the stabilization trajectory) described above in FIG. 4 to FIG. 5.

The above-described lines (e.g., the line 610, the line 620, and the line 630) dependent on the image stabilization strength are examples, and an embodiment may not be limited to the above description.

Figure 8:
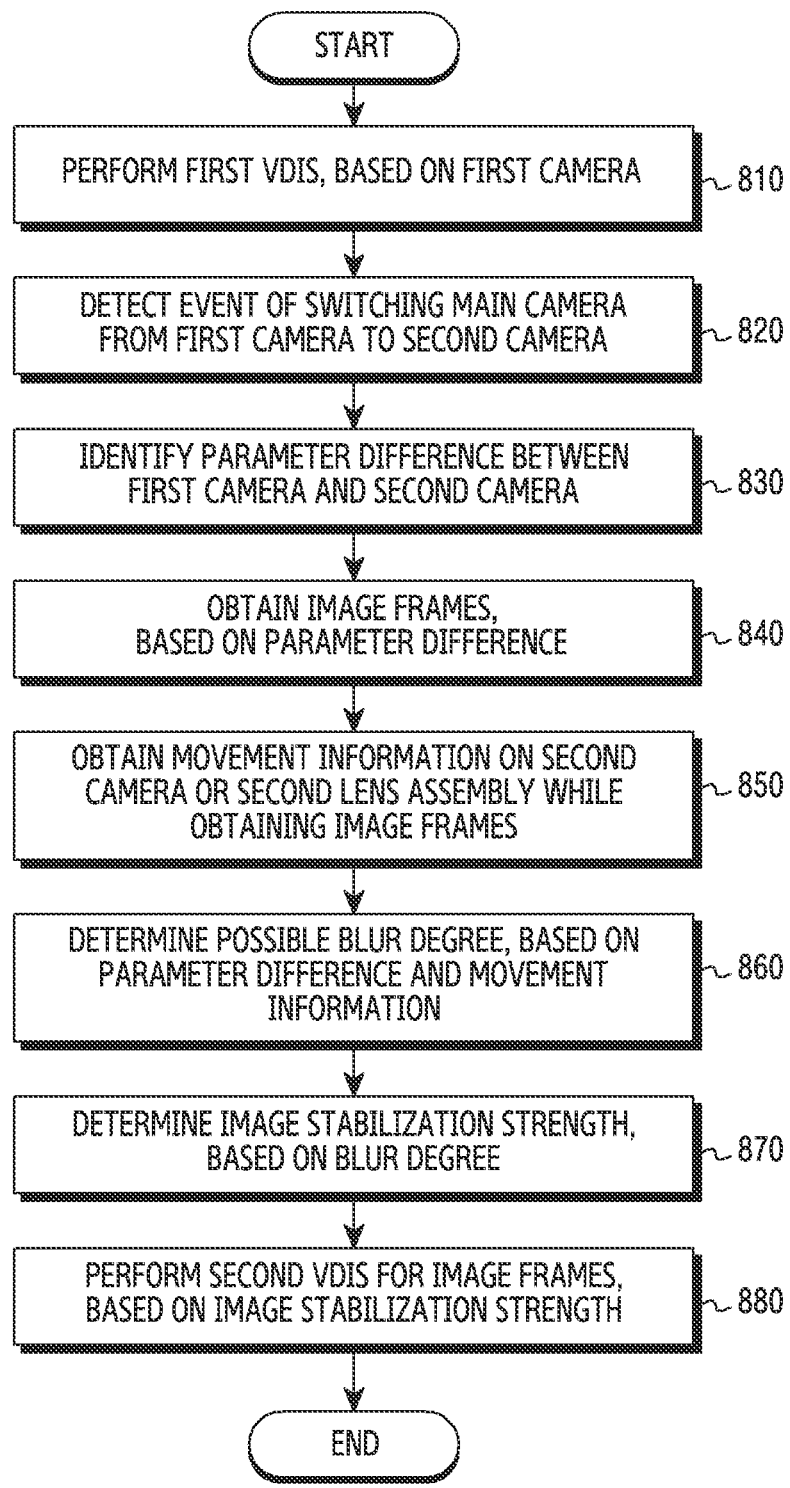
FIG. 8 is a flowchart illustrating a flow in which an electronic device including a plurality of cameras performs VDIS at camera switching according to an embodiment of the disclosure.

FIG. 8 illustrates a flow in which an electronic device including a plurality of cameras performs VDIS at camera switching according to an embodiment.

Referring to FIG. 8, in operation 810, the electronic device may be performing a first VDIS, based on a first camera.

In an embodiment, the first VDIS that the electronic device 101 performs based on the first camera 311 in operation 810 may correspond to VDIS execution operations according to operation 510 to operation 550 of FIG. 5.

In an embodiment, the operation that the electronic device 101 performs based on the first camera 311 in operation 810 may correspond to the operation that the electronic device 101 performs based on the camera 310 in operation 510 to operation 550. For example, the electronic device 101 may determine an exposure value, based on illuminance of when photographing (or when obtaining an image frame), under the control of the processor 350. The electronic device 101 may obtain image frames, based on the exposure value, under the control of the processor 350. The electronic device 101 may obtain movement information on the first camera 311 or a first lens assembly included in the first camera 311 while obtaining the image frames. The electronic device 101 may obtain OIS or not of the first camera 311, and movement information of the first lens assembly when OIS is performed, under the control of the processor 350. The electronic device 101 may determine a possible blur degree, based on the exposure value and the movement information, under the control of the processor 350, and may determine an image stabilization strength, based on the blur degree. The electronic device 101 may perform a first VDIS for image frames, based on the image stabilization strength, under the control of the processor 350.

According to an embodiment, a description of operation 810 of the electronic device 101 is not limited to the above description, and descriptions of operation 510 to operation 550 of FIG. 5 may be applied.

In operation 820 of an embodiment, the electronic device may detect an event of switching a main camera from a first camera to a second camera.

In an embodiment, the electronic device 101 may include a plurality of cameras. For example, the electronic device 101 may include at least the first camera 311 and the second camera 312, but is not limited thereto, and may include three or more cameras as well.

In an embodiment, the event of switching the main camera may be a touch input, a voice input, or a physical input, and there may be no particular limitation.

In an embodiment, the first camera 311 and the second camera 312 included in the electronic device 101 may have a difference in characteristics/parameters. For example, there may be a difference in characteristics/parameters related to a field of view (FOV), the performance of an image sensor, the presence or absence and performance of OIS, a focal distance, the presence or absence of AF, and a zoom operation.

In an embodiment, the electronic device 101 may detect an event of switching the main camera from the first camera 311 to the second camera 312, under the control of the processor 350.

In an embodiment, in response to detecting the switching event, the electronic device 101 may switch the main camera from the first camera 311 to the second camera 312, under the control of the processor 350. Also, a time point when the electronic device 101 switches the main camera under the control of the processor 350 may be before an operation of identifying a parameter difference of operation 830 or may be after the operation of identifying the parameter difference.

In an embodiment, the electronic device 101 may maintain or change the determined exposure value according to the event of switching the camera, under the control of the processor 350.

In operation 830 of an embodiment, the electronic device may identify a parameter difference between the first camera and the second camera.

In an embodiment, the electronic device 101 may identify a parameter difference dependent on the presence or absence of OIS, under the control of the processor 350. For example, when switching is made from the first camera 311 for which OIS is not performed to the second camera 312 for which OIS may be performed, the electronic device 101 may identify OIS execution or not, under the control of the processor 350.

In an embodiment, the electronic device 101 may identify a parameter difference dependent on the performance of an image sensor, a field of view, or a focal distance, under the control of the processor 350. For example, the electronic device 101 may identify a difference of sensitivity between image sensors included in the first camera 311 and the second camera 312, respectively, under the control of the processor 350. Also, the electronic device 101 may identify a difference of a field of view and/or a difference of a focal distance between the first camera 311 and the second camera 312, under the control of the processor 350.

In an embodiment, the electronic device 101 may identify a parameter difference dependent on the performance of OIS, under the control of the processor 350. For example, when OIS may be performed for all of the first camera 311 and the second camera 312, the electronic device 101 may identify a difference of performance between an OIS operation performed by the first camera 311 and an OIS operation performed by the second camera 312, under the control of the processor 350.

In operation 840 of an embodiment, the electronic device may obtain image frames, based on the parameter difference.

In an embodiment, the electronic device 101 may obtain image frames, based on the switched second camera 312, under the control of the processor 350.

In operation 850 of an embodiment, the electronic device 101 may obtain movement information on the second camera 312 or a second lens assembly included in the second camera 312 while obtaining the image frames.

In an embodiment, the electronic device 101 may obtain movement information of the second camera 312, under the control of the processor 350. For example, the electronic device 101 may obtain movement information on the movement/shake of the second camera 312, under the control of the processor 350. For another example, the electronic device 101 may obtain movement information on the movement/shake of the electronic device 101 interlocked with the movement/shake of the second camera 312, under the control of the processor 350 as well.

In an embodiment, the electronic device 101 may obtain movement information on the movement/shake of the electronic device 101 or the second camera 312 by using the sensor 320, under the control of the processor 350. For example, the sensor 320 may be a gyro sensor.

In an embodiment, the electronic device 101 may obtain movement information on the second lens assembly, under the control of the processor 350. For example, the electronic device 101 may obtain OIS or not of the second camera 312, and movement information of the second lens assembly when OIS is performed, under the control of the processor 350.

In an embodiment, the electronic device 101 may normalize movement information on the second camera 312 (or the electronic device 101) or the second lens assembly obtained while obtaining the image frames, under the control of the processor 350. For example, the electronic device 101 may classify and normalize movement information on the second camera 312 (or the electronic device 101) or the second lens assembly according to a movement/shake amount and/or a movement/shake speed, under the control of the processor 350.

In an embodiment, the electronic device 101 may classify and store the normalized movement information in a memory (e.g., the memory 130), under the control of the processor 350 as well.

In operation 860 of an embodiment, the electronic device may determine a possible blur degree, based on the parameter difference and the movement information.

In an embodiment, when switching is made from the first camera 311 not performing OIS to the second camera 312 capable of performing OIS, the electronic device 101 may identify that a blur degree when OIS is not performed is provided greater than that of when OIS is performed, under the control of the processor 350.

In an embodiment, when a sensitivity of an image sensor of the second camera 312 is higher than a sensitivity of an image sensor of the first camera 311, the electronic device 101 may identify that a blur degree of when the second camera 312 is a main camera is provided lower than a blur degree of when the first camera 311 is the main camera, under the control of the processor 350.

In an embodiment, when a field of view of the first camera 311 is greater than a field of view of the second camera 312, the electronic device 101 may identify that a blur degree of when the second camera 312 is the main camera is provided greater than a blur degree of when the first camera 311 is the main camera, under the control of the processor 350.

In an embodiment, when a magnification of the second camera 312 is higher than a magnification of the first camera 311, the electronic device 101 may identify that a blur degree of when the second camera 312 is the main camera is provided greater than a blur degree of when the first camera 311 is the main camera, under the control of the processor 350.

In an embodiment, when a focal distance of the second camera 312 is longer than a focal distance of the first camera 311, the electronic device 101 may identify that a blur degree of when the second camera 312 is the main camera is provided greater than a blur degree of when the first camera 311 is the main camera, under the control of the processor 350.

In an embodiment, when the first camera 311 performs AF and the second camera 312 does not perform AF, the electronic device 101 may identify that a blur degree of when the second camera 312 is the main camera is provided lower than a blur degree of when the first camera 311 is the main camera, under the control of the processor 350.

In operation 870 of an embodiment, the electronic device may determine an image stabilization strength, based on the blur degree.

In an embodiment, when switching is made from the first camera 311 not performing OIS to the second camera 312 capable of performing OIS, the electronic device 101 may determine an image stabilization strength of when OIS is performed, to be greater than an image stabilization strength of when OIS is not performed, under the control of the processor 350.

In an embodiment, when a sensitivity of an image sensor of the second camera 312 is higher than a sensitivity of an image sensor of the first camera 311, the electronic device 101 may determine an image stabilization strength of when the second camera 312 is the main camera, to be higher than an image stabilization strength of when the first camera 311 is the main camera, under the control of the processor 350.

In an embodiment, when a field of view of the first camera 311 is greater than a field of view of the second camera 312, the electronic device 101 may determine an image stabilization strength of when the second camera 312 is the main camera, to be lower than an image stabilization strength of when the first camera 311 is the main camera, under the control of the processor 350.

In an embodiment, when a magnification of the second camera 312 is higher than a magnification of the first camera 311, the electronic device 101 may determine an image stabilization strength of when the second camera 312 is the main camera, to be smaller than an image stabilization strength of when the first camera 311 is the main camera, under the control of the processor 350.

In an embodiment, when a focal distance of the second camera 312 is longer than a focal distance of the first camera 311, the electronic device 101 may determine an image stabilization strength of when the second camera 312 is the main camera, to be smaller than an image stabilization strength of when the first camera 311 is the main camera, under the control of the processor 350.

In an embodiment, when the first camera 311 performs AF and the second camera 312 does not perform AF, the electronic device 101 may determine an image stabilization strength of when the second camera 312 is the main camera, to be greater than an image stabilization strength of when the first camera 311 is the main camera, under the control of the processor 350.

In an embodiment, the electronic device 101 may predict a possible blur degree, based on the movement information (or normalized movement information) on the second camera 312 (or the electronic device 101) or the second lens assembly obtained while obtaining the image frames, under the control of the processor 350. Also, when it is determined that the possible blur degree is large, the electronic device 101 may determine a low image stabilization strength, under the control of the processor 350. When it is determined that the possible blur degree is small, the electronic device 101 may determine a high image stabilization strength, under the control of the processor 350.

In operation 880 of an embodiment, the electronic device may perform a second VDIS for the image frames, based on the image stabilization strength.

In an embodiment, the electronic device 101 may determine the image stabilization strength, based on the possible blur degree determined based on the parameter difference and the movement information, under the control of the processor 350.

In an embodiment, the electronic device 101 may perform the second VDIS for the obtained image frames, based on the determined image stabilization strength, under the control of the processor 350.

According to an embodiment, the electronic device 101 may determine the image stabilization strength according to a change in magnification during a zoom operation, under the control of the processor 350.

In an embodiment, a field of view of the first camera 311 may be wider than a field of view of the second camera 312, and a magnification of the first camera 312 may be lower than a magnification of the second camera 312. In this case, for example, in a zoom operation before switching from the first camera 311 to the second camera 312, the electronic device 101 may determine that a blur degree that is possible for image frames is higher as a magnification increases, under the control of the processor 350. The electronic device 101 may determine an image stabilization strength to be lower as the magnification increases, under the control of the processor 350. For another example, at a time point when the first camera 311 is switched to the second camera 312, as described in operation 860, when a sensitivity of an image sensor of the second camera 312 is higher than a sensitivity of an image sensor of the first camera 311, the electronic device 101 may identify a blur degree of when the second camera 312 is the main camera, to be lower than a blur degree of when the first camera 311 is the main camera, under the control of the processor 350. Also, at a time point when the first camera 311 is switched to the second camera 312, when the OIS performance of the second camera 312 is higher than the OIS performance of the first camera 311, the electronic device 101 may determine that a possible blur degree is low when switching is made to the second camera 312, under the control of the processor 350. The electronic device 101 may determine an image stabilization strength to be higher as a possible blur degree decreases, under the control of the processor 350.

According to an embodiment, the electronic device 101 may perform VDIS, based on the image stabilization strength determined according to the change of the magnification during the zoom operation, under the control of the processor 350.

According to the above-described embodiments, the electronic device 101 may perform shake/movement correction or VDIS according to the determined image stabilization strength, under the control of the processor 350. In order to obtain/display stable image frames, the electronic device 101 may perform shake/movement correction under the control of the processor 350. However, when the stabilization strength is uniformly applied to the image frames in performing the shake/movement correction, an image quality may be more deteriorated. Accordingly, the electronic device 101 of the disclosure may determine a blur degree expected to be possible in the image frames, an exposure value dependent on illuminance, and movement information (e.g., shake and movement of the electronic device 101 or the camera 310), and adjust an intensity of the image stabilization strength, based on the determination, thereby performing the shake/movement correction or VDIS. For example, when a shake of the electronic device 101 or the camera 310 is large, the electronic device 101 may weaken the image stabilization strength and allow not to exceed a limit of a correction amount that is possible for the image frames, thereby improving the quality of the image frames as a whole, under the control of the processor 350.

An electronic device (e.g., the electronic device 101) according to an embodiment may include a camera (e.g., the camera 310) including a lens assembly, at least one sensor (e.g., the at least one sensor 320) for detecting a movement of the camera (e.g., the camera 310) or the lens assembly, and a processor (e.g., the processor 350) electrically connected to the camera (e.g., the camera 310) and the at least one sensor (e.g., the at least one sensor 320). The processor (e.g., the processor 350) may determine an exposure value that will be applied when photographing using the camera (e.g., the camera 310), and obtain image frames, based on the exposure value, and obtain movement information on the camera (e.g., the camera 310) or the lens assembly by using the at least one sensor (e.g., the at least one sensor 320) while the image frames are being obtained, and determine an image stabilization strength, based on the exposure value and the movement information, and perform video digital image stabilization (VDIS) for the image frames, based on the image stabilization strength.

In the electronic device (e.g., the electronic device 101) of an embodiment, the processor (e.g., the processor 350) may determine a possible blur degree, based on the exposure value and the movement information, and determine an image stabilization strength, based on the blur degree.

In the electronic device (e.g., the electronic device 101) of an embodiment, the movement information may include information on a shake of the camera (e.g., the camera 310), and information on a shake of the lens assembly dependent on the execution of OIS.

In the electronic device (e.g., the electronic device 101) of an embodiment, the processor (e.g., the processor 350) may determine a first weight for the exposure value, and determine a second weight for the movement information of the camera (e.g., the camera 310), and determine a first blur degree, based on the first weight and the second weight, and determine a third weight for the movement information of the lens assembly, and determine a blur degree, based on the first blur degree and the third weight.

In the electronic device (e.g., the electronic device 101) of an embodiment, the processor (e.g., the processor 350) may determine the image stabilization strength to be lower as the possible blur degree increases, and determine the image stabilization strength to be higher as the possible blur degree decreases.

In the electronic device (e.g., the electronic device 101) of an embodiment, the blur degree may include at least one of an amount of blur, a size of blur, and a probability of provision of blur.

In the electronic device (e.g., the electronic device 101) of an embodiment, the processor (e.g., the processor 350) may cyclically perform the obtaining of the movement information, the determining of the blur degree, and the determining of the image stabilization strength.

In the electronic device (e.g., the electronic device 101) of an embodiment, the electronic device (e.g., the electronic device 101) may further include at least one or more cameras, and the processor (e.g., the processor 350) may detect an event of switching a main camera from the camera (e.g., the camera 310) to the at least one or more cameras while performing VDIS, and in response to detecting the event, identify a parameter difference between the camera (e.g., the camera 310) and the at least one or more cameras, and obtain the image frames, based on the parameter difference, and obtain movement information on the at least one or more cameras while obtaining the image frames, and determine a possible second blur degree, based on the parameter difference and the movement information, and determine a second image stabilization strength, based on the second blur degree, and perform a second VDIS for the image frames, based on the second image stabilization strength.

In the electronic device (e.g., the electronic device 101) of an embodiment, the event may be at least one of a touch input, a voice input, or a physical input.

In the electronic device (e.g., the electronic device 101) of an embodiment, the movement information may include movement information on at least one lens assembly included in the at least one or more cameras.

In the electronic device (e.g., the electronic device 101) of an embodiment, the parameter difference may be a parameter difference related to at least one of a field of view (FOV), an image sensor, OIS, a focal distance, AF, and a zoom operation.

In the electronic device (e.g., the electronic device 101) of an embodiment, in response to the event, the processor (e.g., the processor 350) may maintain or change the exposure value.

In the electronic device (e.g., the electronic device 101) of an embodiment, the processor (e.g., the processor 350) may provide a stabilization path by using the movement information on the camera (e.g., the camera 310) or the lens assembly, and determine the image stabilization strength, based on the stabilization path.

In the electronic device (e.g., the electronic device 101) of an embodiment, the at least one sensor (e.g., the at least one sensor 320) may be a gyro sensor.

In the electronic device (e.g., the electronic device 101) of an embodiment, a movement of the electronic device (e.g., the electronic device 101) may be interlocked according to a movement of the camera (e.g., the camera 310).

An electronic device (e.g., the electronic device 101) according to an embodiment may include a first camera (e.g., the camera 310) including a first lens assembly, a second camera (e.g., the camera 312) including a second lens assembly, at least one sensor (e.g., the at least one sensor 320) for detecting a movement of the first camera (e.g., the camera 311), the second camera (e.g., the camera 312), the first lens assembly, or the second lens assembly, and a processor (e.g., the processor 350) electrically connected to the first camera (e.g., the camera 311), the second camera (e.g., the camera 312), and the at least one sensor (e.g., the at least one sensor 320). The processor (e.g., the processor 350) may perform a first VDIS, based on the first camera (e.g., the camera 311), and detect an event of switching a main camera from the first camera (e.g., the camera 311) to the second camera (e.g., the camera 312) while performing the first VDIS, and identify a parameter difference between the first camera (e.g., the camera 311) and the second camera (e.g., the camera 312), and obtain image frames, based on the parameter difference, and obtain movement information on the second camera (e.g., the camera 312) or the second lens assembly while obtaining the image frames, and determine a possible blur degree, based on the parameter difference and the movement information, and determine an image stabilization strength, based on the blur degree, and perform a second VDIS for the image frames, based on the image stabilization strength.

In the electronic device (e.g., the electronic device 101) of an embodiment, the event may be at least one of a touch input, a voice input, or a physical input.

In the electronic device (e.g., the electronic device 101) of an embodiment, the parameter difference may be a parameter difference related to at least one of a field of view (FOV), an image sensor, OIS, a focal distance, AF, and a zoom operation.

In the electronic device (e.g., the electronic device 101) of an embodiment, the sensor may be a gyro sensor.

In the electronic device (e.g., the electronic device 101) of an embodiment, the processor (e.g., the processor 350) may determine the image stabilization strength to be lower as the possible blur degree increases, and determine the image stabilization strength to be higher as the possible blur degree decreases.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a camera comprising a lens assembly;
   at least one sensor configured to detect a movement of the camera or the lens assembly;
   a processor; and
   memory storing one or more instructions that, when executed by the processor, cause the electronic device to:
      determine an exposure value that will be applied when photographing using the camera,
      obtain image frames, based on the exposure value,
      obtain movement information on the camera or the lens assembly by using the at least one sensor while the image frames are being obtained,
      predict a blur degree, based on the exposure value and the movement information,
      determine an image stabilization strength, based on the predicted blur degree, and
      perform video digital image stabilization (VDIS) for the image frames, based on the image stabilization strength.

2. The electronic device of claim 1, wherein the movement information comprises:
   information on a shake of the camera, and
   information on a shake of the lens assembly dependent on execution of optical image stabilization (OIS).

3. The electronic device of claim 1, wherein the one or more instructions, when executed by the processor, further cause the electronic device to:
   determine a first weight for the exposure value,
   determine a second weight for the movement information of the camera,
   determine a first blur degree, based on the first weight and the second weight,
   determine a third weight for the movement information of the lens assembly, and
   predict the blur degree, based on the first blur degree and the third weight.

4. The electronic device of claim 1, wherein the one or more instructions, when executed by the processor, further cause the electronic device to:
   determine the image stabilization strength to be lower as the predicted blur degree increases, and
   determine the image stabilization strength to be higher as the predicted blur degree decreases.

5. The electronic device of claim 1, wherein the predicted blur degree comprises at least one of an amount of blur, a size of blur, and a probability of provision of blur.

6. The electronic device of claim 1, wherein the one or more instructions, when executed by the processor, further cause the electronic device to cyclically perform the obtaining of the movement information, the determining of the predicted blur degree, and the determining of the image stabilization strength.

7. The electronic device of claim 1, further comprising:
   at least one or more cameras, wherein the one or more instructions, when executed by the processor, further cause the electronic device to:
      detect an event of switching a main camera from the camera to the at least one or more cameras while performing VDIS,
      in response to detecting the event, identify a parameter difference between the camera and the at least one or more cameras,
      obtain the image frames, based on the parameter difference,
      obtain movement information on the at least one or more cameras while obtaining the image frames,
      predict a second blur degree, based on the parameter difference and the movement information,
      determine a second image stabilization strength, based on the predicted second blur degree, and
      perform a second VDIS for the image frames, based on the second image stabilization strength.

8. The electronic device of claim 7, wherein the event is at least one of:
   a touch input,
   a voice input, or
   a physical input.

9. The electronic device of claim 7, wherein the movement information comprises movement information on at least one lens assembly comprised in the at least one or more cameras.

10. The electronic device of claim 7, wherein the parameter difference is a parameter difference related to at least one of:
    a field of view (FOV),
    an image sensor,
    optical image stabilization (OIS),
    a focal distance,
    auto focus (AF), or
    a zoom operation.

11. The electronic device of claim 7, wherein, in response to the event, the processor maintains or changes the exposure value.

12. The electronic device of claim 1, wherein the one or more instructions, when executed by the processor, further cause the electronic device to:
provide a stabilization path by using the movement information of the camera or the corresponding lens assembly, and
determine the image stabilization strength, based on the stabilization path.

13. The electronic device of claim 1, wherein the at least one sensor is a gyro sensor.

14. The electronic device of claim 1, wherein a movement of the electronic device is interlocked according to a movement of the camera.

15. An electronic device comprising:
a first camera comprising a first lens assembly;
a second camera comprising a second lens assembly;
at least one sensor for detecting a movement of the first camera, the second camera, the first lens assembly, or the second lens assembly;
a processor electrically connected to the first camera, the second camera, and the at least one sensors; and
memory storing one or more instructions that, when executed by the processor, cause the electronic device to:
perform a first video digital image stabilization (VDIS), based on the first camera, p2 detect an event of switching a main camera from the first camera to the second camera while performing the first VDIS,
identify a parameter difference between the first camera and the second camera,
obtain image frames, based on the parameter difference,
obtain movement information on the second camera or the second lens assembly while obtaining the image frames,
predict a blur degree, based on the parameter difference and the movement information,
determine an image stabilization strength, based on the predicted blur degree, and
perform a second VDIS for the image frames, based on the image stabilization strength.

16. The electronic device of claim 15, wherein the event is at least one of:
a touch input,
a voice input, or
a physical input.

17. The electronic device of claim 15, wherein the parameter difference is a parameter difference related to at least one of:
a field of view (FOV),
an image sensor,
optical image stabilization (OIS),
a focal distance,
auto focus (AF), or
a zoom operation.

18. The electronic device of claim 15, wherein the sensor is a gyro sensor.

19. The electronic device of claim 18, wherein the one or more instructions, when executed by the processor, further cause the electronic device to:
determine the image stabilization strength to be lower as the predicted blur degree increases, and
determine the image stabilization strength to be higher as the predicted blur degree decreases.

* * * * *